United States Patent [19]
Lahm

[11] 3,878,742
[45] Apr. 22, 1975

[54] NUMERICALLY CONTROLLED LATHES

[75] Inventor: Heinrich Lahm, Esslingen-Sirnau, Germany

[73] Assignee: Index-Werke KG Hahn & Tessky, Esslingen, Germany

[22] Filed: Nov. 29, 1973

[21] Appl. No.: 420,146

[30] Foreign Application Priority Data
Dec. 4, 1972 Germany.......................... 2259372

[52] U.S. Cl.............................. 82/1 C; 82/2 B; 82/5
[51] Int. Cl............................ B23b 3/00; B23b 1/00
[58] Field of Search................... 82/1, 1 C, 2, 2 B, 5

[56] References Cited
UNITED STATES PATENTS

| | | | |
|---|---|---|---|
| 3,174,367 | 3/1965 | Lukens | 82/5 |
| 3,226,649 | 12/1965 | Kelling | 82/2 X |
| 3,381,557 | 5/1968 | Dunn | 82/5 |
| 3,595,106 | 7/1971 | Pomella | 82/1 |
| 3,656,377 | 4/1972 | Kosen | 82/1 C |
| 3,698,268 | 10/1972 | Cutler | 82/2 B |
| 3,715,938 | 2/1973 | Ledergerber | 82/1 C |
| 3,720,120 | 3/1973 | Cutler | 82/2 B |

Primary Examiner—Harrison L. Hinson
Attorney, Agent, or Firm—Murray Schaffer

[57] ABSTRACT

A numerically controlled lathe having a spindle for holding a workpiece and a carriage for holding a tool comprising compound slides movable in longitudinal and transverse axes. The spindle is connected to the numerical control system so that its rotation is selectively obtained at predetermined indexes or angles corresponding to the path of movement normal for the tool carriage, in one direction, while the carriage itself is held stationary in that direction.

9 Claims, 2 Drawing Figures

NUMERICALLY CONTROLLED LATHES

BACKGROUND OF INVENTION

The present invention relates to numerically controlled automatic lathes for turning, drilling or similarly working metal or the like workpieces.

Lathes of this type have a main or head spindle rotatably holding the workpiece and a turret holding one or more tools in juxtaposition with the workpiece. The turret is mounted on a compound movable carriage assembly comprising a first slide movable in a longitudinal direction parallel to the axis of rotation of the spindle or workpiece and a second slide movable in a perpendicular or transverse direction normal to or across the axis of the rotation of the workpiece. The main spindle as well as the longitudinal and cross slides are provided with individual drive means. A numerical control device is employed to regulate the movement of the longitudinal and/or cross slides so that the tool can be made to traverse and be fed to the workpiece. One such lathe is described in German patent publication OS No. 2,101,878.

In accordance with the aforementioned patent publication it is possible to carry out drilling operations eccentric to the axis of rotation of the workpiece, by adjustably positioning the main spindle at selected angular locations, to thereby maintain predefined spacings between the drillings. The adjustment of the main spindle in its angular position is achieved indirectly from the numerical control device whose main purpose is to regulate the movement of the carriage assembly. The main spindle is connected by either a mechanical or an electrical coupling to the carriage assembly so that on adjustment of the carriage assembly a set of commands or signals are created which are passed via the coupling to simultaneously cause rotation of the main spindle, the rotation corresponding to the informational path determining the feeding of the work tool by the carriage so that a conforming rotary movement of the main spindle is created at a rate proportional to or equal to the extent of the movement of the carriage assembly along the entire time period of such movement. This forced movement or direct drive coupling between the main spindle and the carriage assembly has certain disadvantages. It is not possible to independently set the carriage assembly in a selected position and independently adjust the position of the main spindle in predetermined angular positions. It is therefore not possible to make grooves or carry out any machining operation on the periphery of the workpiece which extends over only a portion or less than the full width with the workpiece. In addition the drive coupling between the carriage assembly and the spindle can only be established mechanically by complicated gear transmissions and/or electrically by the use of an additional complex secondary control system.

It is the object of the present invention to provide a lathe of the type described in which the disadvantages of the prior art devices are overcome and an improved control system is provided.

It is a further object of the present invention to provide a lathe of the type described in which a regulated selective turning of the main spindle can be assured in relationship with the carriage assembly. It is a further object of the present invention to provide an improved lathe of the type described in which eccentric drillings, grooves and machinings can be performed over the full or extent only a portion or partial extend of the workpiece.

It is still a further object of the present invention to provide an improved lathe of the type described in which complex workings such as screw threads and the like can be formed on the workpiece in an easy and simple manner.

These and other objects together with numerous advantages of the present invention will be apparent from the following disclosure.

SUMMARY OF THE INVENTION

A numerically controlled lathe is provided having a spindle for holding a workpiece and a carriage for holding a work tool. The spindle is provided with motor means for rotating the workpiece about an axis and the carriage is similarly provided with motor means for moving the tool in a parallel and in a transverse axis to the workpiece. A numerical control system provides signals for actuating the motor means to move the carriage in selected paths along the two axes. According to the present invention means are provided for controlling the rotation of the spindle directly from the numerical control means while simultaneously holding the carriage stationary in one of its axes. The spindle is rotated for a time and in a controlled path corresponding to the control signals which would be normally fed to the carriage for movement in the now stationary axis, so that the spindle movement is in synchronism with the movement of the carriage in the other axial direction.

In accordance with the present invention, the rotation of the spindle is thus controlled by that portion of the numerical control system which would normally control the movement of the carriage in one of its axial directions. The spindle is thereby able to describe a working path on the workpiece which is the resultant of the vector paths of the carriage in its remaining movement axis and the rotation of the spindle. With the present invention various curved forms and workings may be provided on the periphery of the workpiece or on its planar end face. Standard lathes may be adapted to the present invention and may be provided with means for carrying it out without the use of expensive or extensive technical revision or major reconstruction. The standard lathes may thus be used to provide end millings on the planar end faces or on the cylindrical periphery of the workpiece in the form of spiral curves or grooves of constant or variable pitch or even to make screw threads and the like. This is accomplished since, in each case according to the present invention, a synchronous relationship exists between the movement of the carriage in at least one of its axial directions and the simultaneous rotation of the spindle. Since the path direction of movement is preprogrammed by the numerical control system a direct functional correlation exists between the carriage and the spindle.

Preferably the carriage comprises a longitudinal slide on which is carried a cross slide. In order to program lengths of curves of constant and variable pitch use is made of their circular and linear interpolation which is then translated into a program by which the longitudinal and cross slides are synchronously operated. Curved outlines can be produced with a very high degree of precision.

Preferably the spindle is provided with a primary motor drive operable during normal working of the workpiece and an auxiliary motor drive operable during the synchronous working of the workpiece with the carriage. A shiftable transmission is provided to selectively shift the spindle from connection with the main to the auxiliary motor drive. Since slow spindle rotation relative to the movement of the carriage may be required in order to produce certain working configurations on the workpiece, the motor drive of the auxiliary motor may be chosen with a lower speed ratio or it may be a variable speed motor or a suitable variable transmission may be provided with a reduction gear system. Servo-control systems are employed to sense the movement of the carriage and the spindle and to feed back to the numerical control system so as to regulate the speed and degree of turning as well as the duration of movement. As a result the coordinated adjustment of the carriage and the spindle can be obtained so that the workpiece may be worked through angles and in paths of varying size and within any portion of its longitudinal extent. Thus the workpiece can be milled, drilled or worked in manners not otherwise possible except with lathes having multiple axes of spindle rotation.

Full details of the present invention are given in the following description and are shown in the accompanying drawing.

DESCRIPTION OF INVENTION

Figure 1:
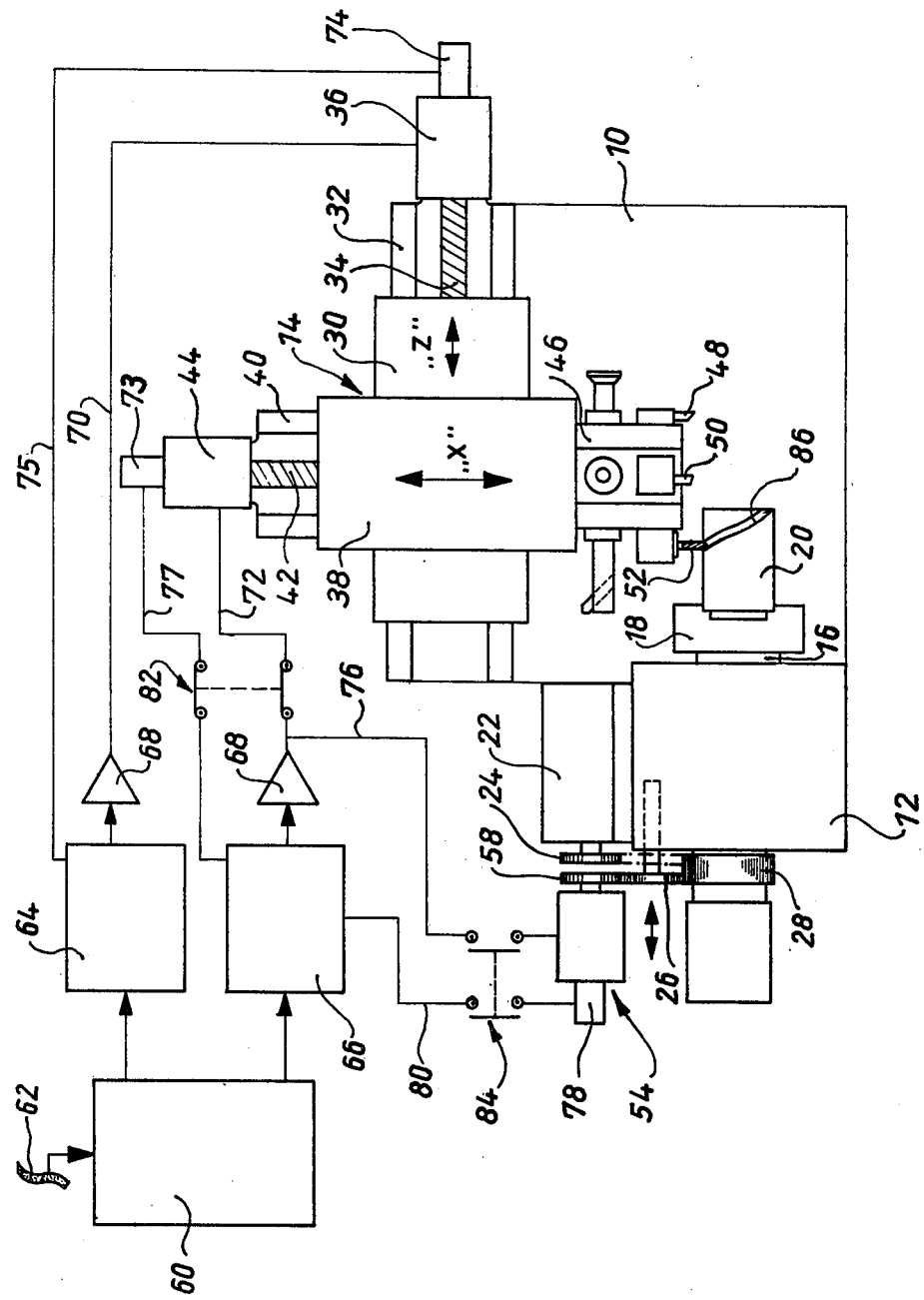
FIG. 1 depicts a plan view of a lathe and the system for controlling its operation according to the present invention.

Turning to FIG. 1 the present invention is illustrated in conjunction with a lathe comprising an undercarriage or bed 10 on which is mounted a head stock 12 and a compound slidable turret carriage assembly, generally depicted by the numeral 14. A main spindle 16 is rotatably mounted within the head stock 12. The spindle 16 carries a collet chuck 18 in which a workpiece 20 such as a cylindrical bar or rod is secured.

A drive device such as a reversible electric motor 22 is mounted on the bed 10, adjacent the head stock 12 and is coupled to the main spindle by a transmission train comprising at least a drive gear wheel 24, a laterally shiftable intermediate gear 26 and a double width driven gear wheel 28 fixedly secured coaxially about the spindle 16. The motor 22 is controlled and regulated by conventional and well known means. The lathe, as so far described except for the shiftable gear, is conventional in nature and conforms to those well known in this art. It may be provided with a tail stock for holding the end of the workpiece if desired or with other conventional mechanisms for working the workpiece.

The compound carriage assembly 14, comprises a longitudinal slide 30 movable along an axis Z parallel to the axis of the spindle 16 on a pair of guide rails 32 by a ball and roller spindle drive 34. The spindle drive 34 is driven by a reversible electric motor 36. A transverse or cross slide 38 is mounted directly on the longitudinal slide 30 to be movable along an axis X normal to the axis of the spindle 16 and therefore normal to the axis Z. The cross slide 38 is itself mounted on a pair of spaced guide rails 40, being movable by a ball and roller spindle 42 which is operated by a reversible motor 44 in a manner similar to that described previously. The reversible motors 36 and 44 are signal actuated to move or to index each of the slides 30 and 38 in individually selected longitudinal and transverse positions along the Z and X axes respectively, all relative to the workpiece 20. The motors may be continuously driven or driven over defined periods of time to continuously move or index the carriage as desired. The signal may be a continuous electric current or a pulse, digital or analog signal.

Mounted on the cross slide 38 is an adjustable tool holding turret 46 on which is provided, in a known manner, several tools such as turning cutters 48 and 50 and/or a rotary drill or miller 52. The tools may be selected by successive rotation of the turret and are designed, mounted and driven in a manner conventional in the art, needing no further discussion herein.

The main spindle 16 is selectively connected to an auxiliary drive means 54, via a drive gear wheel 58 engageable with the intermediate transmission gear 26, on shifting of the intermediate gear. The drive gear wheel 54 is mounted coaxially with the drive gear 24 of the primary motor 22. The intermediate gear 26 is mounted in conventional manner to be reciprocally shiftable, in the direction of the double arrows, to be selectively engageable with either one of the drive gears 24 or 58, thereby positively connecting either one of the motors 22 or 54 to the spindle 16. Various speed reduction gears or variable transmissions may be employed for either the primary or auxiliary drives so that variable speed operation can be obtained relative to the drive motors 36 and 34 for the carriage slides. Variable speed motors may also be used.

The control and regulation of the compound carriage assembly 14 and of the additional auxiliary drive motor 54 is accomplished via a numerical control system comprising an input control unit 60 such as a conventional computer or the like to which signals are fed from an information carrier 62 such as a punched tape, punched card, magnetic tape disc or the like. The information carrier 62 develops a series of signals or pulse commands in the control unit 60 corresponding to a predetermined and preselected program for working the workpiece. The command signals obtained from the programmed information carrier are fed from the control unit 60 via servo-control units 64 and 66 each having an amplifier 68, through leads 70 and 72 respectively to the drive motors 36 and 44 of the longitudinal and cross slides. The slides 30 and 38 are movable in their respective axial directions by the actuation of their motors by the command signals. The adjusted or changed positions of each of the motors 36 and 44 is monitored by angular position sensors 73 and 74 which are connected electrically via lines 75 and 77 to the servo-control units 64 and 66 respectively. The actual position of the carriage slides 30 and 38 is thus determined by the rotative movement of their actuating motors which is fed back to the servo-control units 64 and 66 where they are compared with the command signals until a null point is reached indicating the fact that the selected operative position has been obtained in the same manner.

The auxiliary drive motor 54 is also controlled numerically by connection to one of the servo-control units 64 or 66. In the example shown in FIG. 1 the corresponding command signals are passed from the servo-control unit 66, normalling controlling the cross slide, via a line 76 to the auxiliary motor 54. The auxiliary motor 54 is also monitored by an angular position sensor 78 which is connected by a feed back lead 80 to the control unit 66. Double pole throw switches 82 and 84 are interposed respectively in the paired leads 72–77 and 76–80 comprising the control and feed back leads to the cross slide motor and to the auxiliary motor. The numerical control system can thus be selectively connected alternatively or simultaneously to either the cross slide or the auxiliary motor 54 to actuate the cross slide member 38 and the auxiliary motor as selectively desired. The switches may be remote controlled and/or manually controlled. Automatic relay control switches may be used which are controlled directly from the command signals preprogrammed on the information carrier.

The operation of the lathe is illustrated as follows:

Assuming that the workpiece is to be initially turned, the tool turret 46 is indexed so that either the tool 48 or 52 faces the workpiece. The main spindle 16 is coupled to the primary drive motor 22 by shifting, either automatically in response to the stored program or manually the intermediate gear 26 to the right, as seen in the dotted outline of FIG. 1. As a result the workpiece will be rotated about the spindle axis 20 by the primary motor 22. The double pole switch 84 interposed between the auxiliary drive motor 54 and the servo-control unit 64 is placed in opened position thus rendering the motor drive 54 inactive. The rotation of the spindle 16 is thus independently affected relative to the carriage assembly and does not rely upon the movement of the carriage. Simultaneously the double pole switch 82 is closed so that both motors 36 and 44, for the respective members of the carriage assembly, are connected to their respective control units. This permits a voltage command signal to be applied to each of the motors 36 and 44 in response to the information fed by the information carrier means 62 into the numerical control unit 60. In this manner the members of the compound carriage can be moved synchronously along the Z- and X-axes to cause the cutting tool 48 or 50 to turn the periphery of the workpiece in the conventional manner.

After the workpiece is so turned, it may be milled to provide it with a groove 86 over a portion of its periphery. The groove 86 as illustrated, extends along a spiral line within and below the surface of the workpiece. To effect this the tool turret is indexed to present the miller 52 opposite the workpiece. Next, the intermediate gear wheel 26 is shifted to the left as seen in FIG. 1, so that a connection is made between the auxiliary drive motor 54 and the spindle 16. The shifting of the gear wheel 26 simultaneously disconnects the primary motor drive 22 from connection with the spindle 16 so that notwithstanding the continued rotation of the primary motor it will have no affect upon the rotation of the spindle. After this the double pole switch 82 is opened, disconnecting the motor 44 and position sensor 73 of the cross slide 38 from connection with the servo-control unit 66.

Simultaneously the double pole switch 84 between the auxiliary drive motor 54 and the servo-control unit 66 is closed so that the source of voltage command signals may be passed from the control unit 66 to the motor drive 54. In this condition the longitudinal carriage member 30 continues to receive command signals from the numerical control system movably adjusting the traverse of the tool turret via its own servo-control unit 64, parallel to the axis of the spindle and along the axial direction Z. At the same time the cross slide 38 remains in its fixed position relative to the longitudinal slide since it no longer receives command signals from its control unit 66. The command signals which would however have gone to the cross slide 38 are however fed from the servo-control unit 66 to the auxiliary drive motor 54 via lines 76 and 80. This means that now, the longitudinal slide and the main spindle 16 act in conjunction with each other in such a way that the path information or adjustment command signals stored on the information carrier 62 for movement along the X-axis, results in a predetermined angular rotation of the main spindle 16. The spindle 16 is thus rotated in conjunction and synchronism with the carriage assembly. Consequently the miller 52 when itself rotated in the turret, will move in a coordinated path to produce on the surface of the workpiece a shape corresponding to the resultant vector of longitudinal movement of the carriage and the rotary movement of the spindle. The groove 86 is illustrative of this. This vectored shape can be accomplished, as desired over the entire or over only a portion of the surface of the workpiece and may be in any curve desired depending upon the initial vectors of carriage and spindle movement. The extent and the shape of the groove will of course depend upon the program stored in the information carrier 62 which may be provided in accordance with any of the known techniques available in this art.

The double pole switch 82, shown interposed between the servo-control unit 66 and the cross slide, may instead be interposed in the lines 70 and 75 between the servo-control unit 64 and the longitudinal slide motor 36 and the position sensor 74. Indeed a third double pole switch may be employed at that position rendering the apparatus more versatile. It will thus be obvious that by holding the longitudinal slide stationary and by coordinating the movement of the cross slide borings or holes can be made in the periphery of the workpiece as well as in the end face of the workpiece. Curved grooves may also be made in the end face of the workpiece by using the end cutting tool and correspondingly adjusting the movement of the transverse or cross slides, as described earlier to cause the work tool to move in a predesired path with respect to the end face.

Figure 2:
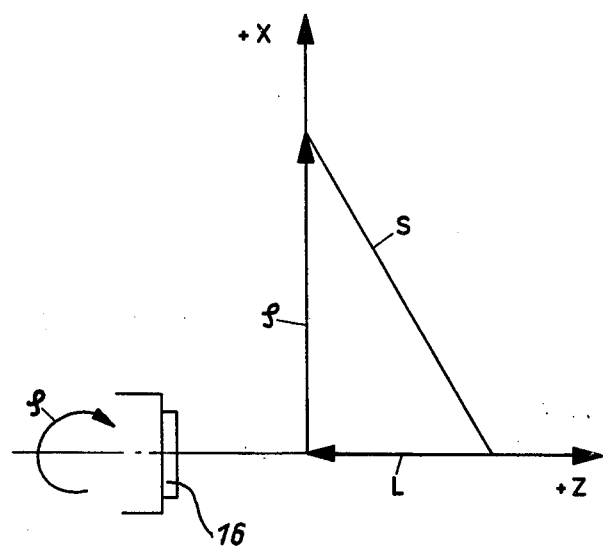
FIG. 2 is an example of a program for carrying out the cutting of a thread on the periphery of a cylindrical workpiece utilizing the lathe according to FIG. 1.

Various combinations of operation can be made as will be readily apparent to those skilled in this art, and various coordinated programs regulating the command signals to the spindle 16 and to the respective members of the carriage assembly 14 can be devised. One such additional example is illustrated in FIG. 2 where the drilling of a screw thread on the surface of the workpiece is shown. As seen in FIG. 2, a diagonal or slant vector S is programmed along which the working point or cutting edge of the rotary miller or drill will move with respect to the rotating or turning workpiece. The control axes or directions of movement will normally transform into a mathematical relationship wherein the vector path $X \triangleq \phi$ and $Z \triangleq L$ which form the components of the diagonal resultant vector S. Thus by simultaneously moving the longitudinal slide and the workpiece on the spindle in the coordinated vectors L and respectively, the tool tracer path corresponding to the diagonal or resultant S. By following the procedure for forming the groove 86 as described earlier, that is by appropriately switching over the switches 82 and 84 so that the signals normally intended to control movement along the X-axis, are passed to the auxiliary drive motor 54, the spindle can be angularly indexed or adjusted while the cross slide is held stationary. Thus the path normally intended for the X-direction can be translated into rotary movement while simultaneously the traversing signal along the Z-direction moves the longitudinal slide. Consequently a spiral or curved path corresponding to the resultant vector S produces a thread on the surface of the workpiece having a pitch L/φ. The information carrier and the command signals may as will be obvious, control both the duration of motor activation as well as the speed of activation by the length of the pulse and the voltage level of the pulse. By appropriately programming these command signals the relative movements along the L and φ paths may be synchronized and regulated relative to each other so that the pitch may be held constant or it may be varied at any time during the work operation. Modifying the relationship between L and φ may also be affected through control of the servo-control units and the general numerical control unit to which the information carrier feeds its program.

It will thus be seen that the present invention enables the synchronouus control of the operating elements of a lathe so that selected movements of the tool and carriage can be obtained. The rotation of the spindle can be accomplished independently to perform the normal work operations allowing the movement of both the longitudinal and cross slides to be accomplished solely via the numerical control system. On the other hand the rotation of the spindle can be directly connected and synchronized to the movement of either the longitudinal or cross slides to obtain selective conjunctive operation between the carriage and the spindle. In this connection the rotation of the spindle is controlled by the numerical control system while one of the slides is held in its stationary position. In this instance the movement of the spindle is derived from the program and the servo-control unit which would normally drive the stationary slide. As a result a work vector is obtained between the movement of the spindle and the movement of one of the slides only. Various compound curves, working directions, and operations on the workpiece can be easily obtained merely by providing the synchronized program.

A suitable numerical control system, which may be employed in the present system is commercially available and was described by the General Electric Company, Waynesboro, Va. under the name Mark Century 7542. Reference may be made to the General Electric publication dated February 1970, GEK 15159 for description of the control operation, GEK 14899 for a phase-analog servo system, GEK 14897 for a single-phase servo and GEK 14948 for a resolver feedback unit, and to other sections if needed.

Various modifications and embodiments have been shown and suggested. Accordingly, it is intended that the present disclosure be taken as illustrative only and not as limiting of the scope of the invention.

I claim:

1. A numerically controlled lathe having a rotatable spindle for holding a workpiece, a carriage for holding the tool in operation with said spindle, said carriage comprising a compound slide having a longitudinal slide member and a cross slide member movable respectively along axes parallel and transverse to the axis of said spindle, means for independently driving each of said slide members, and a numerical control system providing a predetermined program for each axis to control the means for respectively driving said slide members, drive means for rotating said spindle, means for diverting the predetermined program for controlling the means for driving one of said slide members to said means for driving said spindle to control said means for driving said spindle in accordance with said predetermined program, said spindle rotation being thereby controlled by the predetermined program for driving said carriage in one axis in synchronism with the movement of the carriage in the other axis while said carriage is held stationary against movement in the one axis.

2. The lathe according to claim 1 wherein said means for driving said slide members includes a pair of motor means for respectively driving each of said longitudinal and cross slide members and said numerical control system includes actuating means coupled to each of said motor means for providing a signal to operate each of said motor means and drive means for rotating said spindle includes a first and second motor and means for selectively coupling one of said first and second means for driving said spindle to said spindle, said first means for driving said spindle being operable independently of the movement of said carriage, and switch means interposed between said coupled actuating means and at least one of said motor means and second means for driving said spindle to selectively feed said signal to either said motor means or said second means for driving said spindle.

3. The lathe according to claim 2 wherein said switch means is interposed between the actuating means and the motor means for the cross slide and said means for driving said spindle whereby the carriage may be held stationary in the transverse axis and the spindle rotated with respect to said longitudinal axis.

4. The lathe according to claim 2 wherein said means for driving said spindle comprises a primary motor, an auxiliary motor and transmission means selectively interconnecting said spindle to one of said primary and auxiliary motors, said auxiliary motor being connected via said switch means to said coupled actuating means.

5. The lathe according to claim 2 including means for sensing the movement of each of said longitudinal and cross slides and said spindle, said sensors producing a signal indicative of said movement and means returning said signal to said numerical control system.

6. The lathe according to claim 5 wherein said means for moving said carriage and said spindle comprise respectively rotary motors, and said sensors comprise angular position detectors.

7. The lathe according to claim 6 wherein said motor for driving said spindle has a speed different from that of the motors driving said carriage.

8. The lathe according to claim 6 wherein said motors have means for varying their speed.

9. A method for working a workpiece on a numerically controlled lathe having a spindle for holding a workpiece, and a carriage for holding a tool in cooperation with said workpiece, said compound carriage having members moveable independently in respective longitudinally and transversely axes with respect to the axis of rotation of said spindle, comprising the steps of simultaneously rotating said spindle and moving said carriage in each of said axes controlling the movement of each of said carriage members by a numerical control system providing a predetermined program along a vector path for each of said respective axes, and selectively diverting the predetermined program of one vector path from one of said carriage members to control the rotation of said spindle, whereby said carriage is selectively held stationary with respect to one axis of movement and said spindle is rotated along a vector path in synchronism with the path of movement of the carriage in the other axis.

* * * * *